(12) United States Patent
Surnilla et al.

(10) Patent No.: US 8,590,510 B2
(45) Date of Patent: Nov. 26, 2013

(54) FUEL SYSTEM FOR A MULTI-FUEL ENGINE

(75) Inventors: Gopichandra Surnilla, West Bloomfield, MI (US); Joseph Basmaji, Waterford, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 756 days.

(21) Appl. No.: 12/862,316

(22) Filed: Aug. 24, 2010

(65) Prior Publication Data
US 2012/0048242 A1 Mar. 1, 2012

(51) Int. Cl.
*F02M 37/04* (2006.01)
*F02M 51/00* (2006.01)

(52) U.S. Cl.
USPC .......................................... 123/431; 123/575

(58) Field of Classification Search
USPC ......... 123/431, 432, 299, 300, 497, 479, 480, 123/575; 701/103–105
See application file for complete search history.

(56) References Cited

U.S. PATENT DOCUMENTS

| | | | |
|---|---|---|---|
| 6,125,832 A * | 10/2000 | Toyohara et al. | 123/479 |
| 6,230,688 B1 | 5/2001 | Faix et al. | |
| 6,742,479 B2 | 6/2004 | Yanagisawa | |
| 6,748,923 B2 | 6/2004 | Grossner et al. | |
| 7,720,592 B2 * | 5/2010 | Leone et al. | 123/575 |
| 7,770,562 B2 | 8/2010 | Pursifull et al. | |
| 8,078,386 B2 * | 12/2011 | Stein et al. | 123/575 |
| 2008/0257304 A1 | 10/2008 | Noda et al. | |

* cited by examiner

*Primary Examiner* — Hieu T Vo
(74) *Attorney, Agent, or Firm* — Julia Voutyras; Alleman Hall McCoy Russell & Tuttle LLP (57) ABSTRACT

Methods and systems are provided for operating an engine fuel system including fuels of different fuel types. A first fuel type is delivered for port injection upon circulation through a high pressure pump when direct injection of a fuel is not requested to cool and/or lubricate the high pressure pump.

20 Claims, 6 Drawing Sheets

FUEL SYSTEM FOR A MULTI-FUEL ENGINE

BACKGROUND AND SUMMARY

Various fuel systems may be used to deliver a desired amount of fuel to an engine for combustion. One type of fuel system includes a port fuel injector and a direct injector for each engine cylinder. The port injectors may be operated during engine starting to improve fuel vaporization and reduce engine emissions. The direct injectors may be operated during higher load conditions to improve engine performance. In addition, both port injectors and direct injectors may be operated under some conditions to leverage advantages of both types of fuel delivery.

Direct injection fuel systems may include a high pressure fuel pump upstream of a fuel rail to raise a pressure of the fuel delivered to the engine cylinders through the direct injectors. However, when the high pressure fuel pump is turned off, such as when no direct injection of fuel is requested, pump durability may be affected. Specifically, the lubrication and cooling of the pump may be reduced while the high pressure pump is not operated, thereby leading to pump degradation.

Various approaches have been developed to reduce high pressure pump degradation. In one approach, as shown by Faix et al. in U.S. Pat. No. 6,230,688, a constant fuel lubrication flow quantity is branched off from the delivery flow of a low pressure pump coupled to a fuel tank, and delivered to a high pressure pump.

However, the inventors herein have identified a potential issue with such an approach. As one example, when the fuel tank becomes empty or the fuel level in the fuel tank falls below a threshold, the constant lubrication flow may not be available. Consequently, the high pressure pump may degrade. In particular, in dual fuel systems where the fuel tank coupled to the direct injection system is smaller than the fuel tank coupled to the port injection system, the fuel tank may become empty more often, leading to frequent disabling of the high pressure pump. As such, this may reduce the reliability of the high pressure pump.

Thus, in one example, the above issue may be at least partly addressed by a method of operating an engine fuel system. In one embodiment, the method comprises, supplying a first type of fuel solely from a first fuel tank to a second fuel pump and to a group of port fuel injectors via a first fuel pump, an output of the second fuel pump in communication with a group of direct injectors, and supplying the first type of fuel from an outlet of the second fuel pump to the group of port fuel injectors.

In one example, an engine may include a dual fuel system with a first fuel tank storing a first fuel type (such as, gasoline) and a second fuel tank storing a second fuel type (such as an alcohol blend like E85). A first group of port injectors in communication with a group of cylinders of the engine may be configured to port inject fuel into the group of cylinders. A second group of direct injectors also in communication with the group of cylinders may be configured to direct inject fuel into the group of cylinder. A first low pressure pump, in communication with the first fuel tank, may be operated to deliver the first fuel type along a first fuel passage to a first common rail of the first group of port injectors. Similarly, a second low pressure pump, in communication with the second fuel tank, may be operated for delivering the second fuel type along a second fuel passage to a second common rail of the second group of direct injectors. In one example, the low pressure fuel pumps may be electrically-driven.

The fuel system may also include a high pressure fuel pump, the output of the high pressure pump communicating with the first and second group of injectors, may be provided along the second fuel passage. In one example, the high pressure fuel pump may be mechanically driven. The high pressure fuel pump may communicate with the second group of direct injectors via the second common rail, and may further communicate with the first group of port injectors via a solenoid valve and the first common rail. During selected engine operating conditions, such as when direct injection of a fuel (first or second fuel type) is requested, the high pressure pump may be operated in addition to the low pressure pump corresponding to the fuel type so as to raise a pressure of the fuel delivered to the second common rail and through the direct injectors, thereby delivering a high pressure direct injected fuel into the group of cylinders.

The fuel system may further include a first bypass passage coupling the first fuel passage to the second fuel passage upstream of the high pressure pump, and a second bypass passage coupling the first fuel passage to the second fuel passage downstream of the high pressure pump. The second bypass passage may include a solenoid valve, such as an electronically controlled solenoid valve, coupling the first fuel passage to the second fuel passage, downstream of the high pressure pump, when the valve is opened. Thus, when opened, the output of the high pressure pump can communicate with the first group of port injectors via the solenoid valve. In comparison, when closed, the high pressure pump can communicate with the second group of direct injectors.

Based on engine operating conditions, operation of one or more of the low pressure pumps coupled to the first and second fuel tanks, as well as operation of the high pressure pump may be adjusted, while also adjusting the opening of the solenoid valve, to thereby provide fuel to the group of cylinders via the first and/or second group of injectors while enabling sufficient cooling and/or lubrication of the high pressure pump.

For example, based on engine operating conditions, as well as an amount of fuel available in each of the first and second fuel tanks, a first amount of the first fuel type may be port injected into the cylinders. Accordingly, the first low pressure pump may be operated to supply the first fuel to the group of port injectors via the first fuel pump only. In another example, based on operating conditions, a second amount of the second fuel type may be direct injected into the cylinders. Accordingly, the second low pressure pump may be operated to supply the second fuel to the high pressure pump, and the high pressure pump may be operated to raise the pressure of the received second fuel. The higher pressure fuel may then be supplied from an outlet of the high pressure pump to the second group of direct injectors. As such, when direct injection is enabled, the flow of fuel through the high pressure pump enables sufficient cooling and lubrication of the high pressure pump.

During selected engine operating conditions, such as when no direct injection of fuel is requested but cooling and/or lubrication of the high pressure pump is required (such as due to the pump temperature exceeding a threshold temperature and/or a duration of pump operation exceeding a threshold duration), fuel may be port injected into the group of cylinders via the high pressure pump. Specifically, the first low pressure pump may be operated to supply solely the first fuel type from the first fuel tank to the high pressure pump, and the high pressure pump may be operated to supply solely the first fuel type from an outlet of the high pressure pump to a first group of port injectors via the (open) solenoid valve. An output of the high pressure pump may be coordinated with the output of the first low pressure pump to provide a desired fuel rail pressure at the first common rail of the first group of injectors, and to adjust the amount of fluid circulated through the high pressure pump. At the same time, the second low pressure fuel pump and the second group of direct injectors may be deactivated. In this way, by supplying at least some of the first fuel type to the first group of injectors via the high pressure pump, the high pressure pump may be maintained lubricated and cooled even when no direct injection is requested, thereby reducing high pressure pump degradation.

In another example, when direct injection of the second fuel type is requested, but the level of second fuel in the second fuel tank is below a threshold, the first fuel type may be supplied to the group of direct injectors via the high pressure pump to compensate for the second fuel as well to reduce degradation of the high pressure pump due to fuel insufficiency. Specifically, if the fuel level in the second fuel tank is below the threshold, and high pressure pump cooling and/or lubrication is required, then the first low pressure pump may be operated to supply solely the first fuel type from the first fuel tank to the high pressure pump, and the high pressure pump may be operated to supply solely the first fuel type from the high pressure pump to the group of direct injectors. Herein, the solenoid valve may remain closed. The controller may determine an amount of first fuel to be direct injected that compensates for the amount of second fuel that was to be direct injected and further to account for high pressure pump cooling and lubrication. Additionally, in case of a sudden surge in cylinder fuel demand, such as during cylinder enrichment, the solenoid valve may be opened and at least some of the first fuel may also be delivered from the high pressure pump to the first group of port injectors via the solenoid valve so the direct injection of the first fuel is supplemented with the port injection of the first fuel. In this way, by flowing fuel of the first fuel type through the high pressure pump when an insufficient amount of second fuel is available, lubrication and cooling of the high pressure pump is enabled.

In this way, by circulating at least some fuel from a first fuel tank through the high pressure pump when no direct injection is required, and/or when no fuel from the second tank (coupled to the direct injector) is available, a high pressure pump may be maintained lubricated and cooled, thereby reducing high pressure pump degradation. Furthermore, by reducing the need to disable the high pressure pump due to insufficient availability of second fuel and/or no need for direct injection, high pressure pump reliability may be improved.

DETAILED DESCRIPTION

Figure 1:
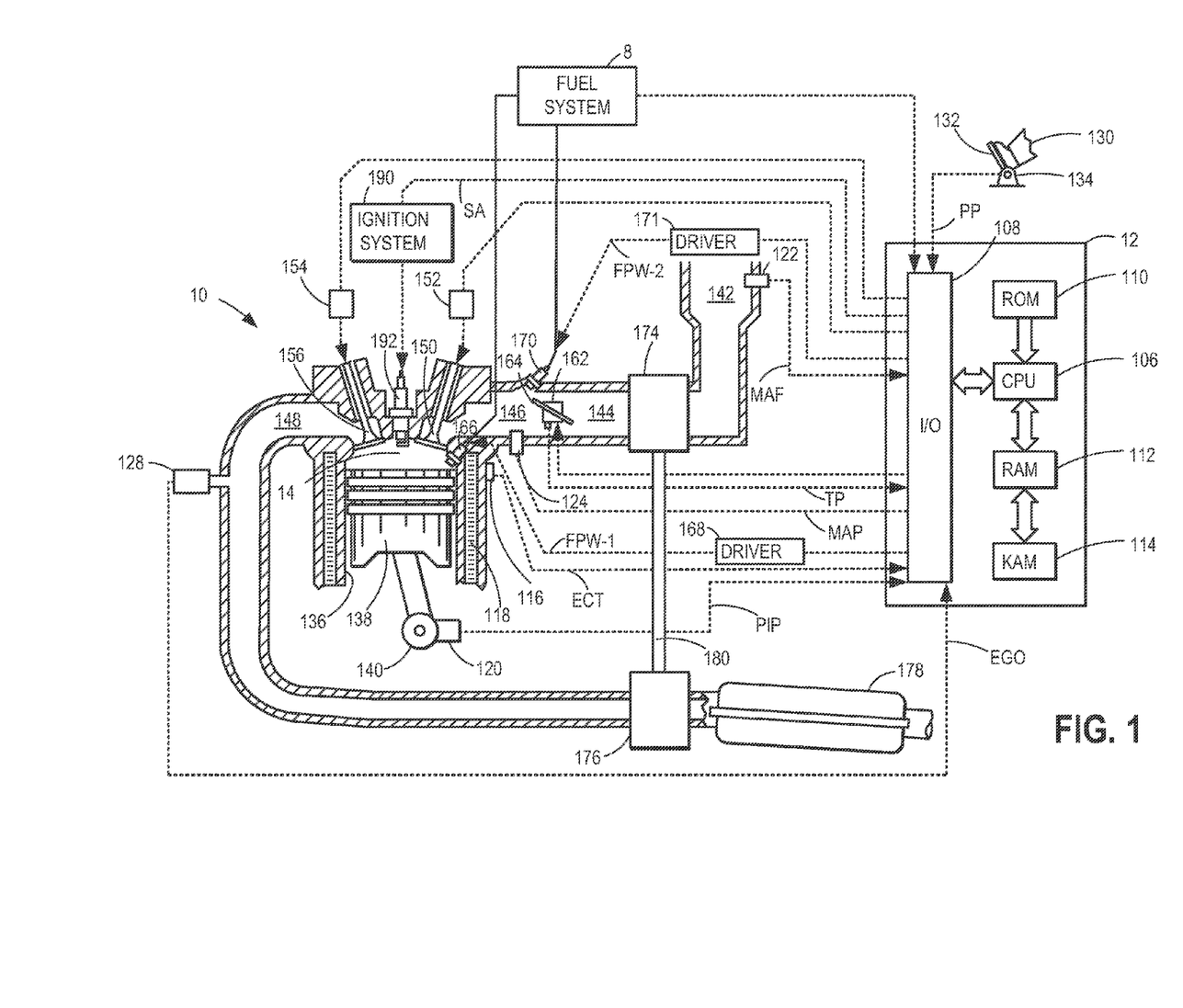
FIG. 1 schematically depicts an example embodiment of a cylinder of an internal combustion engine.
Figure 2:
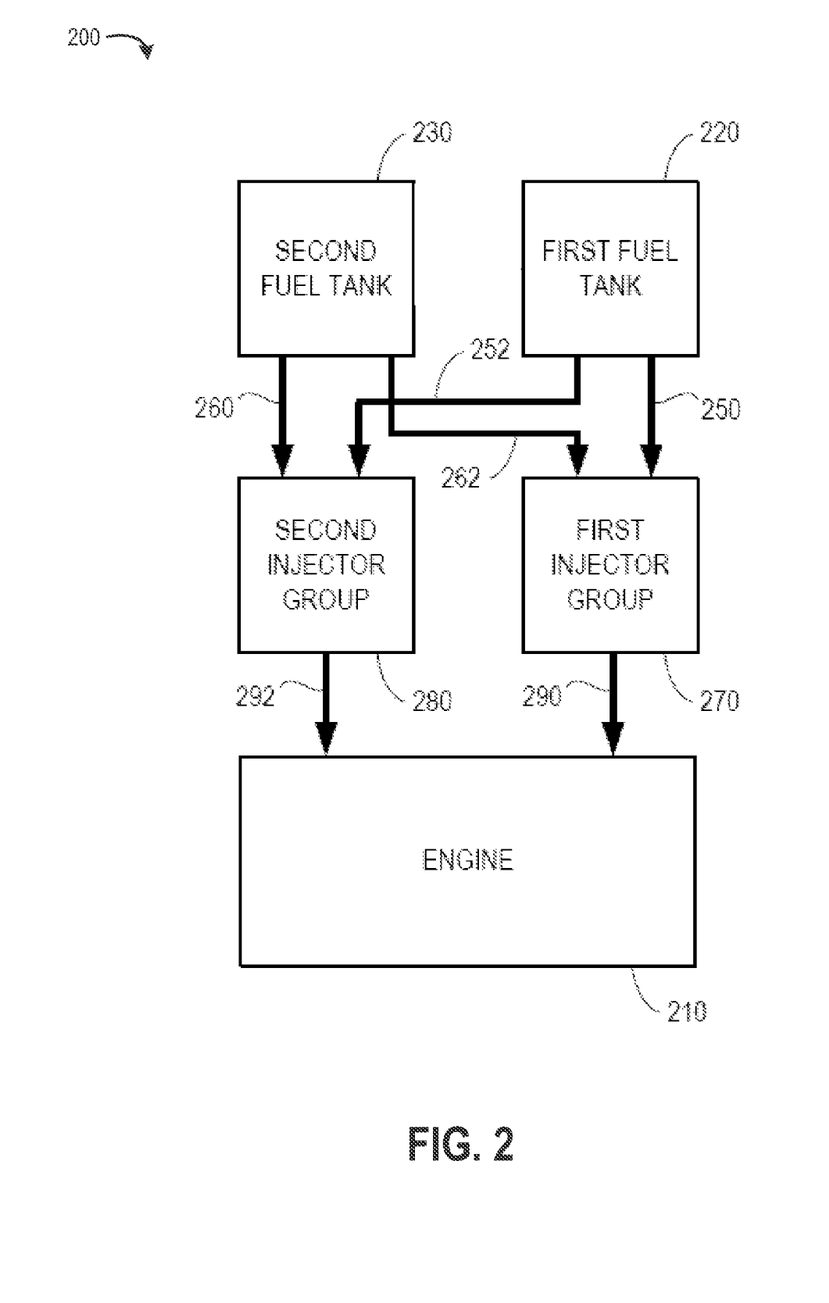
FIG. 2 schematically depicts an example fuel system that may be used with the engine of FIG. 1.
Figure 3:
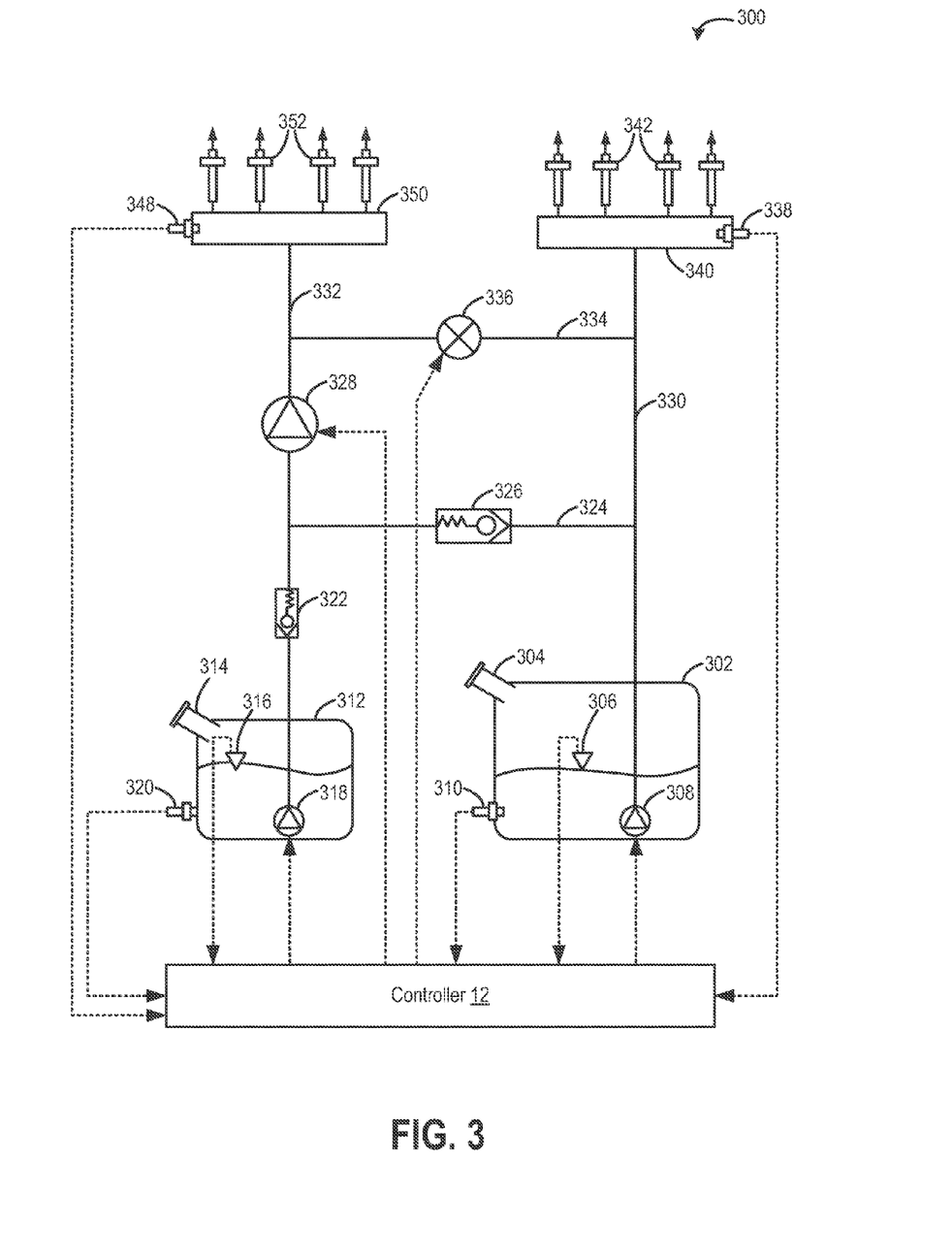
FIG. 3 depicts an example embodiment of the fuel system of FIG. 2.

The following disclosure relates to methods and systems for operating a fuel system, such as the system of FIG. 2, configured to deliver one or more different fuel types to a combustion engine, such as the engine of FIG. 1. As shown in FIG. 3, the fuel system may include a first injector group configured to port inject a selected fuel, and a second injector group configured to direct inject a selected fuel. A high pressure pump may be provided upstream of the second injector group for raising a pressure of the fuel to be direct injected. As such, during direct injection of fuel, the high pressure pump may be sufficiently lubricated. If a sufficient amount of fuel is not available for direct injection, and/or no direct injection is required, an engine controller may maintain lubrication and/ or cooling of the high pressure fuel pump by delivering at least a portion of a port injected fuel through the high pressure fuel pump to port injectors. The controller may be configured to perform one or more routines, such as those of FIGS. 4-6, to selectively open a solenoid valve downstream of the high pressure pump, while disabling the direct injection system, to enable fuel to be delivered to the port injectors upon passage through the high pressure pump. In this way, by maintaining pump lubrication and cooling even when no direct injection is performed, degradation of the high pressure pump may be reduced, and pump reliability may be improved.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2-3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12. An example embodiment of fuel system 8 is further elaborated herein with reference to FIG. 2.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine.

As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

FIG. 2 schematically depicts an example embodiment 200 of fuel system 8 of FIG. 1. A more specific example of fuel system 200 is described in greater detail with reference to FIG. 3. Fuel system 200 may be operated to deliver fuel to an engine 210. As a non-limiting example, engine 210 may refer to engine 10, as previously described with reference to FIG. 1.

Fuel system 200 can provide fuel to engine 210 from one or more different fuel sources. In one example, a first fuel tank 220 and a second fuel tank 230 may be provided. While fuel tanks 220 and 230 are described in the context of discrete vessels for storing fuel, it should be appreciated that these fuel tanks may instead be configured as a single fuel tank having separate fuel storage regions that are separated by a wall or other suitable membrane. Further still, in some embodiments, this membrane may be configured to selectively transfer select components of a fuel between the two or more fuel storage regions, thereby enabling a fuel mixture to be at least partially separated by the membrane into a first fuel type at the first fuel storage region and a second fuel type at the second fuel storage region.

In some examples, first fuel tank 220 may store fuel of a first fuel type while the second fuel tank may store fuel of a second fuel type, wherein the first and second fuel types are of differing composition. As a non-limiting example, the second fuel type contained in second fuel tank 230 may include a higher concentration of one or more components that provide the second fuel type with a greater relative knock suppressant capability than the first fuel.

By way of example, the first fuel and the second fuel may each include one or more hydrocarbon components, but the second fuel may also include a higher concentration of an alcohol component than the first fuel. Under some conditions, this alcohol component can provide knock suppression to engine 210 when delivered in a suitable amount relative to the first fuel, and may include any suitable alcohol such as ethanol, methanol, etc. Since alcohol can provide greater knock suppression than some hydrocarbon based fuels, such as gasoline and diesel, due to the increased latent heat of vaporization and charge cooling capacity of the alcohol, a fuel containing a higher concentration of an alcohol component can be selectively used to provide increased resistance to engine knock during select operating conditions.

As another example, the alcohol (e.g. methanol, ethanol) may have water added to it. As such, this reduces the alcohol fuel's flammability giving an increased flexibility in storing the fuel. Additionally, the water content's heat of vaporization enhances the ability of the alcohol fuel to act as a knock suppressant. Further still, the water content can reduce the fuel's overall cost.

As a specific non-limiting example, the first fuel type may include gasoline and the second fuel type may include ethanol. As another non-limiting example, the first fuel type may include gasoline and the second fuel type may include a mixture of gasoline and ethanol, where the second fuel includes a higher concentration of the ethanol component than the first fuel (such as E85), thereby making the second fuel a more effective knock suppressant than the first fuel. In other examples, the first fuel and the second fuel may each include gasoline and ethanol, whereby the second fuel includes a higher concentration of the ethanol component than the first fuel. As yet another example, the second fuel may have a relatively higher octane rating than the first fuel, thereby making the second fuel a more effective knock suppressant than the first fuel. It should be appreciated that these examples should be considered non-limiting as other suitable fuels may be used that have relatively different knock suppression characteristics.

Fuel may be delivered to engine 210 from one or more of fuel tanks 220 and 230 by one or more fuel injectors. As previously described with reference to FIG. 1, an engine may include one or more of direct fuel injectors and port fuel injectors. In this way, fuel may be delivered to different locations of the engine relative to each of the engine's cylinders. As a non-limiting example, a first injector group 270 may include a group of port fuel injectors in communication with a group of cylinders of the engine while a second injector group 280 may include a group of direct injectors in communication with the group of cylinders. However, in other examples, first injector group 270 may refer to a first direct fuel injector per each engine cylinder while second injector group 280 may refer to a second direct fuel injector per each engine cylinder. As yet another example, first injector group 270 may refer to a first port fuel injector per each engine cylinder while second injector group 280 may refer to a second port fuel injector per each engine cylinder.

In some embodiments of the fuel system, fuel may be provided to first injector group 270 from first fuel tank 220, as indicated at 250, wherefrom it may delivered to engine 210, as indicated at 290. In some embodiments, fuel may be additionally or alternatively provided to fuel injector group 280 from first fuel tank 220, as indicated at 252, wherefrom it may delivered to engine 210, as indicated at 292. In this way, a first fuel may be selectively delivered to each cylinder of engine 210 from first fuel tank 220 via one or more different fuel injectors.

Furthermore, in some embodiments of the fuel system, fuel may be provided to second injector group 280 from second fuel tank 230 as indicated at 260, wherefrom it may delivered to engine 210, as indicated at 292. In some embodiments, fuel may be alternatively or additionally provided to fuel injector group 270 from second fuel tank 230, as indicated at 262, wherefrom it may delivered to engine 210, as indicated at 290. In this way, fuel may be selectively delivered to each cylinder of engine 210 from second fuel tank 230 via one or more different fuel injectors.

Further still, in some embodiments, fuel may be selectively transferred between first fuel tank 220 and second fuel tank 230. As one example, at least a portion of a first fuel contained in first fuel tank 220 may be transferred to second fuel tank 230, where it may be mixed with a second fuel contained in second fuel tank 230. As such, where the first fuel and the second fuel initially have different compositions, the transfer of the first fuel from first fuel tank 220 to second fuel tank 230 may potentially change the composition of the second fuel contained in second fuel tank 230.

Further still, under some conditions fuel rails associated with the fuel injectors may be selectively flushed by replacing a fuel contained in the fuel rail with a different fuel. As one example, this approach may be used in preparation for a starting of the engine (e.g. at key-off or key-on) to provide the better starting fuel to the appropriate fuel injectors, including higher volatility fuels such as gasoline, methane, or a heated fuel.

Turning to FIG. 3, an example fuel system 300 is depicted that may be operated by a controller to perform some or all of the operations described with reference to the process flow of FIGS. 4-6.

Fuel delivery system 300 may include a first fuel tank 302 and a second fuel tank 312. As depicted schematically in FIG. 3, fuel tanks 302 and 312 may differ in their fuel storage capacities. However, it should be appreciated that in alternate embodiments, fuel tanks 302 and 312 may have the same fuel storage capacity. As a non-limiting example, as depicted, where second fuel tank stores a fuel with a higher knock suppressant capability, second fuel tank may have a smaller fuel storage capacity than the first fuel tank. Fuel may be provided to fuel tanks 302 and 312 via respective fuel filling passages 304 and 314.

As a non-limiting example, first fuel tank 302 may be configured to store a first fuel type while second fuel tank 312 may be configured to store a second fuel type having a higher concentration of a knock suppressant component than the first fuel. Fuel filling passages 304 and 314 may include fuel identification markings for identifying the type of fuel that is to be provided to the corresponding fuel tank. In one example, the first fuel type includes at least some gasoline while the second fuel type includes at least some ethanol. In another example, the first fuel type includes at least some gasoline while the second fuel type includes at least some type of alcohol (e.g. methanol or ethanol).

A first low pressure fuel pump 308 in communication with first fuel tank 302 may be operated to supply the first type of fuel from the first fuel tank 302 to a first group of port injectors 342, via a first fuel passage 330. In this way, first fuel passage 330 fluidly couples the first fuel tank to the group of port injectors. In one example, first fuel pump 308 may be an electrically powered low pressure fuel pump, disposed at least partially within first fuel tank 302. Fuel lifted by first fuel pump 308 may be supplied at a lower pressure into a first fuel rail 340 coupled to one or more fuel injectors (for example, as depicted herein, four injectors) of first group of port injectors 342 (herein also referred to as first injector group). While first fuel rail 340 is shown dispensing fuel to the four fuel injectors of first injector group 342, it will be appreciated that first fuel rail 340 may dispense fuel to any suitable number of fuel injectors. As one example, first fuel rail 340 may dispense fuel to one fuel injector of first injector group 342 for each cylinder of the engine. Note that in other examples, first fuel passage 330 may provide fuel to the fuel injectors of first injector group 342 via two or more fuel rails. For example, where the engine cylinders are configured in a V-type configuration, two fuel rails may be used to distribute fuel from the first fuel passage to each of the fuel injectors of the first injector group.

A second low pressure fuel pump 318 in communication with second fuel tank 312 may be operated to supply the second type of fuel from the second fuel tank 302 to a second group of direct injectors 352, via a second fuel passage 332. In this way, second fuel passage 332 fluidly couples the second fuel tank to the group of direct injectors. In one example, second fuel pump 318 may also be an electrically powered low pressure fuel pump, disposed at least partially within second fuel tank 312. Fuel lifted by second fuel pump 318 may be supplied at a lower pressure into second fuel passage 332. Second fuel pump 318 may also be in communication with a higher pressure fuel pump 328 that is included in second fuel passage 332. In one example, high pressure fuel pump 328 may be mechanically powered. High pressure fuel pump 328 may further communicate with the group of direct injectors 352 via a second fuel rail 350, and the group of port injectors 342 via a solenoid valve 336. Thus, lower pressure fuel lifted by second fuel pump 318 may be further pressurized by high pressure fuel pump 328 so as to supply higher pressure fuel for direct injection to a second fuel rail 350 coupled to one or more fuel injectors (for example, as depicted herein, four injectors) of second group of injectors 352, herein also referred to as second injector group. As a non-limiting example, the one or more fuel injectors of second injector group 352 may be configured as direct fuel injectors, for example, as previously described with reference to fuel injector 166. In the embodiment where the injectors of second injector group 352 are configured as direct injectors, second fuel pump 318 and high pressure pump 328 can be operated to provide a higher fuel pressure to second fuel rail 350 than the fuel pressure that is provided to first fuel rail 340 by first fuel pump 308. As elaborated herein, during select engine operating conditions, the high pressure pump 328 may also be operated to supply fuel of the first fuel type, lifted from the first fuel tank 302 by first low pressure pump 308, to the first group of port injectors via a valve (herein, a solenoid valve) coupling the group of direct injectors to the group of port fuel injectors.

Fluid communication between first fuel passage 330 and second fuel passage 332 may be achieved through first and second bypass passages 324 and 334. Specifically, first bypass passage 324 may couple first fuel passage 330 to second fuel passage 332 upstream of high pressure pump 328, while second bypass passage 334 may couple first fuel passage 330 to second fuel passage 332 downstream of high pressure pump 328. One or more pressure relief valves may be included in the fuel passages and/or bypass passages to resist or inhibit fuel flow back into the fuel storage tanks. For example, a first pressure relief valve 326 may be provided in first bypass passage 324 to reduce or prevent back flow of fuel from second fuel passage 332 to first fuel passage 330 and first fuel tank 302. A second pressure relief valve 322 may be provided in second fuel passage 332 to reduce or prevent back flow of fuel from the first or second fuel passages into second fuel tank 312.

In one example, first fuel pump 308, and second fuel pump 318 may have pressure relief valves integrated into the pumps. The integrated pressure relief valves may limit the pressure in the respective lift pump fuel lines. For example, the pressure relief valve integrated in first fuel pump 308 may limit the pressure that would otherwise be generated in first fuel rail 340 if solenoid valve 336 is (intentionally or unintentionally) open and while high pressure pump 328 is pumping.

A solenoid valve 336 may be arranged along second bypass passage 334. In one example, solenoid valve 336 may be an electronically controlled solenoid valve. Additionally, solenoid valve 336 may include (for example, in line with the solenoid valve) a pressure relief valve. During selected conditions, as further elaborated with reference to FIGS. 4-6, an engine controller may be configured to selectively open solenoid valve 336 (for example, by energizing or de-energizing the solenoid, based on the solenoid valve's configuration) to thereby supply an amount of fuel of the first fuel type solely from first fuel tank 302 via first fuel pump 308 to high pressure pump 328, and then supply the first type of fuel from the high pressure pump to the group of port injectors 342. In one example, solenoid valve 336 permits flow in a direction from fuel passage 332 to fuel passage 330 while limiting flow in a direction from fuel passage 330 to fuel passage 332. Herein, an output of the first fuel pump may be adjusted to provide a fuel pressure to the first fuel rail 340 of the group of port injectors, the first fuel type being supplied to the group of port injectors from both the outlet of the high pressure fuel pump and the outlet of the first lower pressure fuel pump in parallel and concurrently, with at least some of the fuel from the outlet of the first lower pressure fuel pump being provided to the group of port injectors by bypassing the high pressure fuel pump.

Alternatively, the controller may selectively close solenoid valve 336 to thereby allow an amount of fuel to be delivered from first fuel tank 302 to first injector group 342 while bypassing high pressure pump 328. Specifically, when direct injection of an amount of fuel is requested, the controller may close solenoid valve 336 and allow the requested amount of fuel to be delivered from second fuel tank 312 to the engine via second injector group 352. At the same time, an amount of fuel, if requested, may be delivered from first fuel tank 302 to the engine via first injector group 342. In comparison, when no direct injection is requested, and/or when the level of fuel in second fuel tank 312 is below a threshold, and high pressure pump lubrication and/or cooling is required, the controller may open solenoid valve 336 and deactivate second injector group 352 and second fuel pump 318, while enabling first injector group 342 and first fuel pump 308, to circulate the pumped fuel through the high pressure pump before delivery to the engine.

Solenoid valve 336 may also be adjusted so that fuel may be provided from the first fuel tank to one or both of fuel rails 340 and 350. For example, in response to a level of the second fuel type in the second fuel tank falling below a threshold, that is, if an insufficient amount of fuel is available in the second fuel storage tank for direct injection, solenoid valve 336 may be opened so that an amount of the first type of fuel can be supplied from the first fuel tank by first fuel pump 308 and high pressure pump 328 to the second injector group, for direct injection into the engine. Additionally, with the solenoid valve open, an amount of fuel may also be delivered from the first fuel storage tank to the first injector group, for port injection into the engine.

In some embodiments, solenoid valve 336 may further include (for example, in line with the solenoid valve) a pressure relief valve. The pressure relief valve may thereby act as a back pressure regulator. In this configuration, the solenoid valve 336 may assist in maintaining fuel pressure levels in the first and second fuel passages 330, 332, as well as in the first and second fuel rails 340, 350. For example, when the solenoid valve is open (intentionally or unintentionally), the pressure relief valve may set the pressure of the second fuel rail 350 to a first pressure (for example, 300 psi). As such, without the pressure relief valve, the pressure in the second fuel rail 350 would drop to the pressure of the second fuel pump 318 (that is, the lift pump pressure), and fuel push-out due to vaporization could occur. Additionally, the low pressure would degrade fuel atomization. Thus, by including the pressure relief valve, the direct injection system (direct injectors, second fuel rail, etc.) are allowed to function properly even when the solenoid valve is open. Additionally, if the fuel rail pressure in the second fuel rail 350 exceeds a target pressure, the pressure relief valve allows the pressure to be lowered.

In some embodiments, the first and/or second bypass passages may also be used to transfer fuel between fuel storage tanks 302 and 312. Fuel transfer may be facilitated by the inclusion of one or more check valves, pressure relief valves, solenoid valves, and/or pumps in the first or second bypass passage. In still other embodiments, one of the fuel storage tanks may be arranged at a higher elevation than the other fuel storage tank, whereby fuel may be transferred from the higher fuel storage tank to the lower fuel storage tank via one or more of the bypass passages. In this way, fuel may be transferred between fuel storage tanks by gravity without necessarily requiring a fuel pump to facilitate the fuel transfer.

The various components of fuel system 300 can communicate with an engine control system, such as controller 12. For example, controller 12 may receive an indication of operating conditions from various sensors associated with fuel system 300 in addition to the sensors previously described with reference to FIG. 1. The various inputs may include, for example, an indication of an amount of fuel stored in each of fuel storage tanks 302 and 312 via fuel level sensors 306 and 316, respectively. Controller 12 may also receive an indication of fuel composition from one or more fuel composition sensors, in addition to, or as an alternative to, an indication of a fuel composition that is inferred from an exhaust gas sensor (such as sensor 126 of FIG. 1). For example, an indication of fuel composition of fuel stored in fuel storage tanks 302 and 312 may be provided by fuel composition sensors 310 and 320, respectively. Additionally or alternatively, one or more fuel composition sensors may be provided at any suitable location along the fuel passages between the fuel storage tanks and their respective fuel injector groups. For example, fuel composition sensor 338 may be provided at first fuel rail 340 or along first fuel passage 330, and/or fuel composition sensor 348 may be provided at second fuel rail 350 or along second fuel passage 332. As a non-limiting example, the fuel composition sensors can provide controller 12 with an indication of a concentration of a knock suppressing component contained in the fuel or an indication of an octane rating of the fuel. For example, one or more of the fuel composition sensors may provide an indication of a concentration of alcohol in the fuel.

Note that the relative location of the fuel composition sensors within the fuel delivery system can provide different advantages. For example, sensors 338 and 348, arranged at the fuel rails or along the fuel passages coupling the fuel injectors with one or more fuel storage tanks, can provide an indication of a resulting fuel composition where two or more different fuels are combined before being delivered to the engine. In contrast, sensors 310 and 320 may provide an indication of the fuel composition at the fuel storage tanks, which may differ from the composition of the fuel actually delivered to the engine.

Controller 12 can also control the operation of each of fuel pumps 308, 318, and 328 to adjust an amount, pressure, flow rate, etc., of a fuel delivered to the engine. As one example, controller 12 can vary a pressure setting and/or fuel flow rate of the fuel pumps to deliver fuel to different locations of the fuel system. The amount of first fuel that is delivered to the first injector group via the high pressure pump may be adjusted by adjusting and coordinating the output of the first low pressure fuel pump and the high pressure fuel pump. For example, the lower pressure fuel pump and the higher pressure fuel pump may be operated to maintain a prescribed fuel pressure at the fuel injectors or fuel rail. A fuel rail pressure sensor coupled to the first common fuel rail may be configured to provide an estimate of the fuel pressure available at the first group of port injectors. Then, based on a difference between the estimated rail pressure and a desired rail pressure, the pump outputs may be adjusted. In one example, where the high pressure fuel pump is a volumetric displacement fuel pump, the controller may adjust a flow control valve of the high pressure pump to vary the effective pump volume of each pump stroke.

Figure 4:
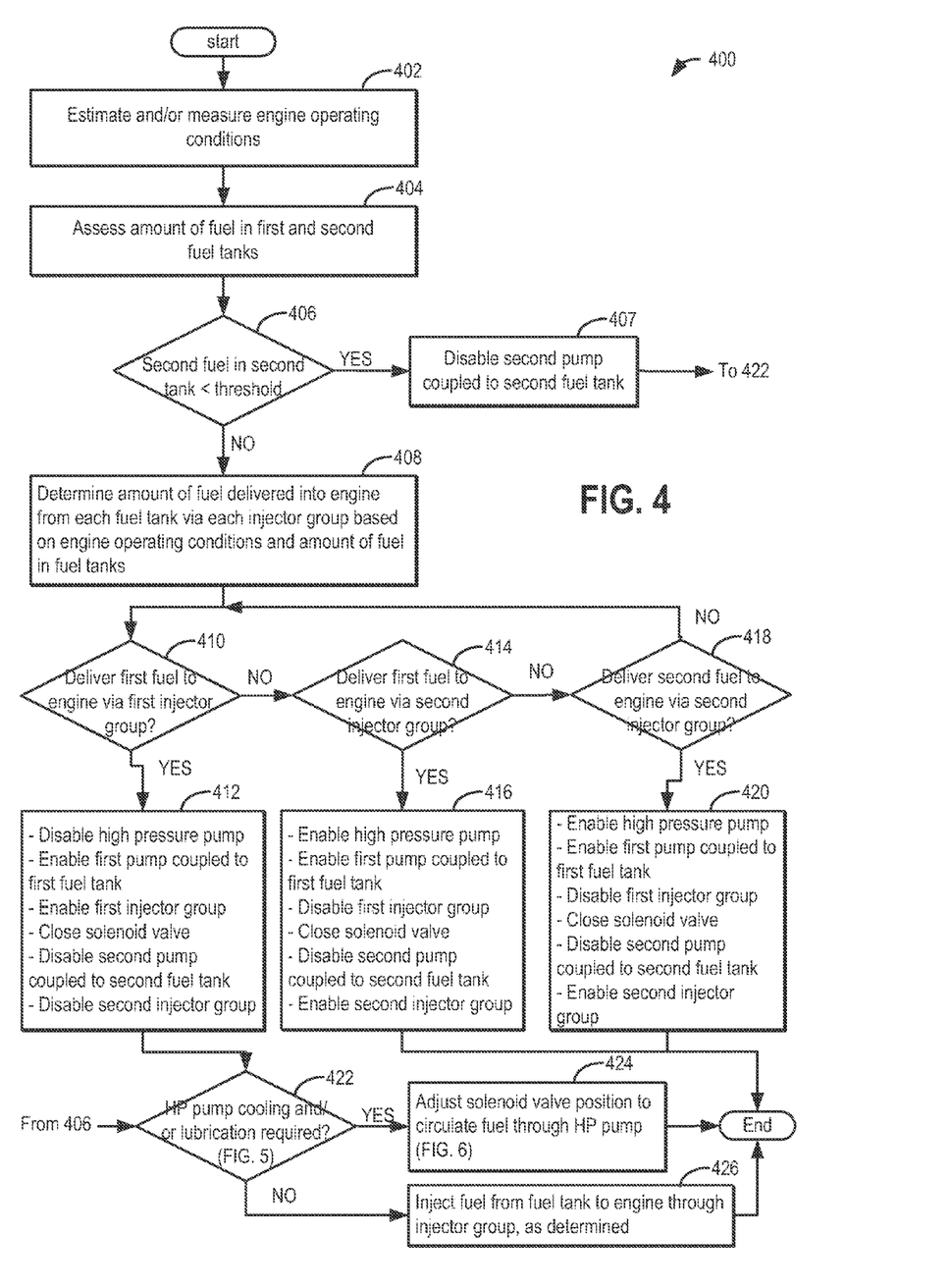
FIGS. 4-6 depict example high level flow charts for adjusting the operation of the fuel delivery system of FIG. 3 to enable lubrication and/or cooling of a high pressure fuel pump, according to the present disclosure.

Now turning to FIG. 4, an example routine 400 is described for adjusting the pumps, valves, and injector groups of FIG. 3 to provide a desired amount of fuel to the engine.

At 402, engine operating conditions may be estimated and/or measured. These may include, for example, engine speed, boost, driver demanded torque, engine temperature, air charge, etc. At 404, an amount of fuel stored in the first fuel storage tank and an amount of fuel stored in the second fuel storage tank may be assessed. In one example, the amount of fuel stored in each tank may be assessed in response to input received from a fuel level sensor associated with each fuel storage tank (such as sensors 306 and 316 of FIG. 3). In alternate embodiments, the amount of fuel in each fuel storage tank may be inferred based on input received from other suitable sensors, including fuel mass sensors, fuel volume sensors, fuel pressure sensors, etc.

At 406, it may be determined whether the amount of fuel in the second fuel tank is below a threshold. In one example, the threshold may correspond to a minimum amount of fuel that may be direct injected through the second injector group during engine operation. As one example, the fuel level may be determined based on the output of a fuel level sensor. Alternatively, the controller may infer the fuel level in the second fuel tank based on a fuel rail pressure (for example, a low fuel rail pressure may indicate an empty fuel tank). As yet another example, the controller may infer the fuel level in the second tank based on the pump pressure of the second fuel pump coupled to the second fuel tank (for example, a low lift pump pressure may indicate an empty fuel tank).

As such, when a sufficient amount of fuel for direct injection is available in the second fuel tank, and an amount of fuel is direct injected to the engine via the high pressure pump, the flow of fuel through the pump ensures high pressure pump lubrication and cooling. In comparison, when sufficient fuel is not available, the high pressure pump may degrade faster due to reduced lubrication and/or cooling. Thus, in response to a fuel level in the second fuel tank falling below a threshold at 406, at 407, the second low pressure fuel pump coupled to the second fuel tank may be deactivated, and the high pressure pump may be set to a minimum volume (e.g., minimum displacement volume) setting. Alternatively, the high pressure pump may be set to a minimum pump rate, flow rate, or stroke rate setting. Further, the routine may proceed to 422 wherein appropriate steps, as elaborated below, may be taken to ensure lubrication and/or cooling of the fuel system's high pressure pump. If the amount of fuel is not below the threshold, that is, sufficient amount of fuel is available in the second fuel tank, then at 408, an amount of fuel to be delivered to the engine from each fuel tank via each injector group may be determined based on the estimated engine operating conditions, as well as the availability of fuels in the fuel tanks. For example, this may include determining an amount of a first fuel to be delivered from the first fuel tank to the engine via the first injector group and/or an amount of second fuel to be delivered to from the second fuel tank to the engine via the second injector group. In one example, the first fuel in the first fuel tank may be gasoline and the second fuel in the second fuel tank may be an ethanol blend such as E85. Thus, the controller may determine a first amount of gasoline to be port injected into the cylinder and/or a second amount of ethanol fuel to be direct injected into the engine cylinder.

At 410, it may be determined whether a first fuel type is to be delivered to the engine via the first group of port injectors. If yes, then at 412, to enable port injection of the first fuel type, the first low pressure pump of the first fuel tank may be activated (to draw fuel from the first tank), and the first (port) injector group may be activated (to deliver the pumped fuel to the engine). Additionally the high pressure pump may be disabled, or deactivated. In one example, this may include sending an electronic signal to cause the high pressure pump to stop pumping while continuing to stroke with a minimum stroke volume (e.g., minimum stroke displacement volume) and/or minimum stroke rate. In another example, disabling the high pressure pump may include sending an electronic signal to stop the pumping and stroking. For example, a deactivation device may be operated to stop pump stroking (e.g., by draining an oil-filled lifter). At the same time, the second low pressure fuel pump coupled to the second fuel tank and the group of direct injectors may be deactivated. Additionally, the solenoid valve coupled to the second bypass passage may be closed, to prevent flow of first fuel type from the first fuel passage into the second fuel passage, and the high pressure pump may be adjusted to the minimum volume (e.g., minimum displacement volume) setting, since no direct injection is required.

From here, the routine may proceed to 422 wherein it may be determined whether cooling and/or lubrication of the high pressure pump of the fuel system is required or not. If yes, as elaborated in FIGS. 5-6, a position of the solenoid valve may be adjusted in the absence of direct fuel injection to enable the first fuel type to be supplied to the group of port injectors through the first low pressure pump and then through the high pressure pump.

If it is determined, at 410, that a first fuel type is not to be delivered via the first injector group, then at 414, it may be determined whether the first fuel is to be delivered to the engine via the second injector group, that is, if the first fuel is to be direct injected. In one example, the first fuel type may be delivered via the second injector group in response to the level of the second type of fuel in the second fuel tank falling below a threshold level. The engine controller may determine an amount of first fuel type that has to be direct injected to compensate for the amount of second fuel type that was to be direct injected. If direct injection of the first fuel type is requested, then at 416, to enable direct injection of the first fuel, the first low pressure fuel pump of the first fuel tank may be enabled (to draw fuel from the first tank) while the second low pressure fuel pump of the second fuel tank is deactivated, and the first (port) injector group may be disabled while the second (direct) injector group is enabled (to deliver the pumped fuel to the engine). Additionally, the solenoid valve coupled to the second bypass passage may be closed, to prevent flow of first fuel from the first fuel passage into the second fuel tank, and the high pressure pump may be enabled, to raise the pressure of the fuel to be direct injected.

If it is determined, at 414, that the first fuel is not to be delivered via the second injector group, then at 418, it may be determined whether a second fuel is to be delivered to the engine via the second injector group, that is, if a second fuel is to be direct injected. If yes, then at 420, to enable direct injection of the second fuel, the second low pressure pump of the second fuel tank may be enabled (to draw fuel from the second tank) while the first pump of the second fuel tank is deactivated, and the first (port) injector group may be deactivated while the second injector group is enabled (to deliver the pumped fuel to the engine). Additionally, the solenoid valve coupled to the second bypass passage may be closed, to prevent flow of second fuel from the second fuel passage into the first fuel passage and first fuel tank. Further still, the high pressure pump may be enabled to raise the pressure of the second fuel to be direct injected.

In some examples, an amount of second fuel may be direct injected into the cylinder in addition to an amount of first fuel being port injected into the cylinder. In such an embodiment, the first pump and first injector group may be additionally enabled to allow simultaneous port and direct injection.

If there is insufficient fuel for a direct injection, that is, the fuel level is the second fuel tank is below a threshold (at 406), and/or if only an amount of fuel is to be port injected (at 412), then at 422, it may be confirmed whether cooling and/or lubrication of the high pressure pump of the fuel system is required or not. If yes, then at 424, and as elaborated in FIGS. 5-6, a position of the solenoid valve may be adjusted to enable circulation of the first fuel through the high pressure pump before delivery through the first (port) injector group, while the second (direct) injector group is kept deactivated. In comparison, if no cooling and/or lubrication is requested, then at 426, an appropriate amount of fuel may be delivered from the appropriate fuel tank to the engine through the appropriate group of injectors, as previously determined at 412, 416, and/or 420.

Figure 5:
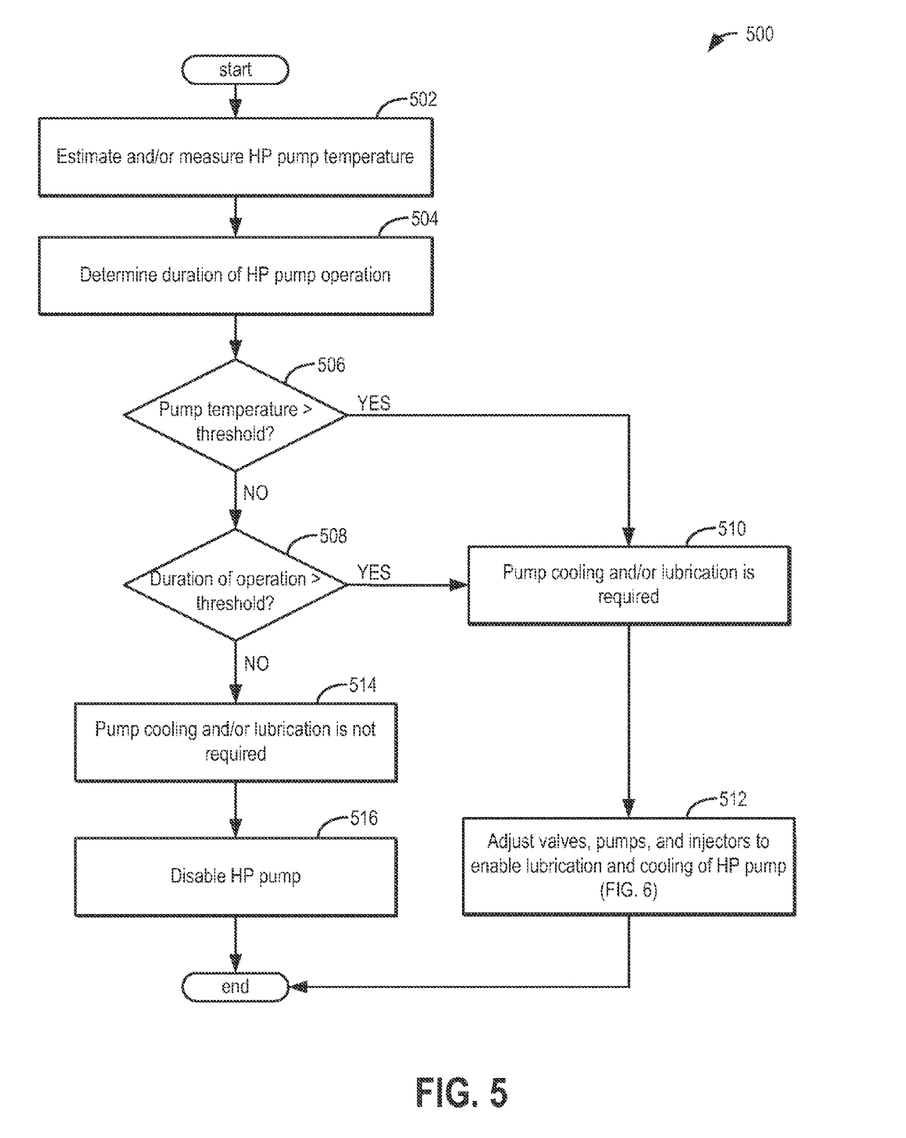

Now turning to FIG. 5, an example routine 500 is described for determining whether cooling and/or lubrication of the high pressure fuel pump of the fuel system of FIG. 3 is required or not. As such, the routine of FIG. 5 may be performed only if direct injection is not enabled, or not possible (such as, due to a sufficient amount of direct injected fuel not being available).

At 502, a temperature of the high pressure pump may be estimated and/or measured, for example, by a dedicated temperature sensor. At 504, a duration of high pressure pump operation may be determined. For example, it may be determined when the engine was last stopped, and the duration of time that has elapsed since then to when the pump was re-enabled. In another example, it may be determined for how long since the last engine key-on operation the pump has been operated. At 506, it may be determined whether the pump temperature is greater than a threshold. In response to a temperature a temperature of the high pressure fuel pump exceeding threshold temperature, at 510, it may be determined that pump cooling and/or lubrication is required, and accordingly at 512, adjustments may be made so that a first fuel type may be supplied to the high pressure fuel pump. If the pump temperature does not exceed the threshold, then at 508, it may be determined whether the duration of pump operation has exceeded a threshold. If yes, then the routine may return to 510 to confirm that pump cooling and/or lubrication is required. Accordingly at 512, and as elaborated in FIG. 6, one or more valves (such as the solenoid valve), pumps, and injectors of the fuel pump may be adjusted (for example, opened/closed, or activated/deactivated) to allow the high pressure pump to be cooled and/or lubricated by supplying fuel of the first fuel type to the high pressure pump from the first fuel tank via the first low pressure pump.

If the pump temperature has not exceeded the threshold temperature and/or the duration of pump operation has not exceeded the threshold duration, then at 514, it may be determined that pump cooling and/or lubrication is not required, and at 516, the high pressure pump may be disabled or deactivated. As previously elaborated, this may include stopping the pump while allowing it to continue stroking with a minimum volume (and/or at a minimum stroke rate). Alternatively, a deactivation device may be operated to stop the pump while also stopping pump stroking. It will be appreciated that while the given example depicts determining when to supply fuel of the first fuel type to the group of port injectors through the high pressure fuel pump in response to temperature and operating conditions of the high pressure fuel pump, in alternate embodiments, the first type of fuel may be supplied to the high pressure fuel pump in response to at least an engine operating condition, including an engine load or engine speed. For example, the first type of fuel may be supplied by the high pressure pump at high engine loads. Further, as elaborated in FIG. 4, the first fuel type may also be supplied to the group of port injectors via the first low pressure fuel pump and the high pressure fuel pump in response to a fuel level in the second fuel tank falling below a threshold.

Figure 6:
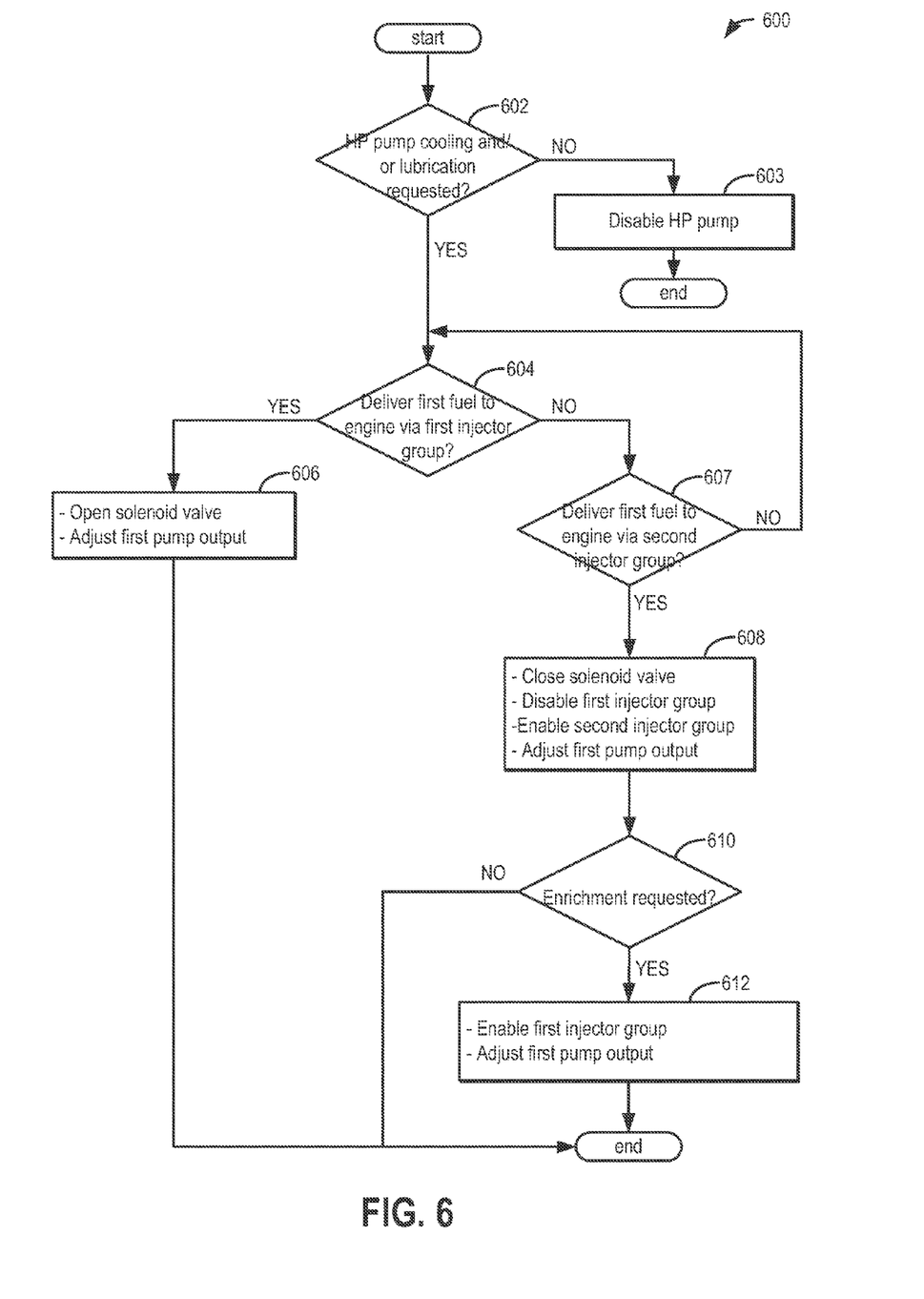

Now turning to FIG. 6, an example routine 600 is described for adjusting the solenoid valve of the fuel system of FIG. 3 to circulate an amount of fuel through the high pressure fuel pump, specifically, when no direct injection of a second fuel is enabled. By supplying a first fuel type to a group of port injectors via a first low pressure fuel pump and a high pressure fuel pump in response to a request for cooling and/or lubrication of the high pressure fuel pump, deactivation of the high pressure fuel pump may be reduced, thereby reducing pump degradation. As such, routine 600 may be performed in conjunction with the routine of FIG. 4, specifically when no direct injection of fuel is requested (at 412 of FIG. 4) and/or in response to a fuel level in the second fuel tank falling below a threshold (at 406 of FIG. 4). Additionally, routine 600 may be performed in conjunction with the routine of FIG. 5 in response to a temperature of the high pressure fuel pump exceeding a threshold temperature, and/or in response to an engine operating condition including engine load. As such, under these conditions, the second low pressure pump coupled to the second fuel tank and the second injector group may be deactivated.

At 602, it may be determined if cooling and/or lubrication of the high pressure pump is requested. As elaborated with reference to FIG. 5, high pressure pump cooling and/or lubrication may be requested after the pump has operated for a threshold duration and/or when the pump temperature exceeds a threshold temperature. As such, when the engine is configured to receive fuel from a fuel tank via the second injector group, that is, by direct injection, the high pressure pump may be operated to raise the pressure of the fuel to be directly injected. During such an operation, passage of the fuel to be directly injected through the high pressure pump may sufficiently cool and/or lubricate the pump. However, when direct injection is not enabled (for example, when only port injection of fuel is requested based on engine operating conditions), and/or when there is not enough fuel available for direct injection (for example, when fuel tank levels of a fuel with knock suppressing capabilities are lower than a threshold), the high pressure pump may not be operated or sufficiently lubricated and cooled, expediting pump degradation. Herein, by adjusting the solenoid valve of the fuel system, a port injected fuel may be circulated through the high pressure pump before being delivered to the engine via the first injector group. Else, if no port injection is required, the fuel may simply be recirculated through the pump until sufficient cooling and/or lubrication is achieved.

Returning to 602, if pump cooling and/or lubrication is not requested, then at 603, the high pressure pump may be deactivated or set to operate at a minimum volume setting. In comparison, if pump cooling and/or lubrication is requested, then at 604, it may be determined whether port injection is requested or not. Specifically, it may be determined whether a first fuel is to be delivered to the engine via the first injector group. If port injection is requested and cooling of the high pressure fuel pump is required, then at 606, a solenoid valve of the fuel system located downstream of the first low pressure fuel pump and upstream of the high pressure fuel pump may be opened while the first low pressure pump of the first fuel tank and the first injector group are enabled. Under such conditions, at least a portion of the first fuel lifted from the first fuel tank by the first pressure pump may be delivered to the first injector group directly along the first fuel passage. Additionally, at least a portion of the lifted fuel may be delivered to the first injector group via the high pressure pump. Specifically, solely the first type of fuel may be delivered from the first fuel tank to the first port injector group and the high pressure fuel pump via the first low pressure fuel pump. Herein, even though the high pressure fuel pump is in communication with the direct injector group and the port injector group, by deactivating the direct injector group and the second low pressure fuel pump, delivery of solely the first fuel type through the high pressure pump is ensured. In one example, the pressure output of the first fuel pump is increased from a first pressure to a second pressure to allow fuel to flow from the low pressure fuel pump (e.g., 308 of FIG. 3) across solenoid valve (e.g., 326 of FIG. 3) to the high pressure fuel pump (e.g., 328 of FIG. 3) and across solenoid valve 336 before fuel is returned to fuel passage 330.

Since the second low pressure pump of the second fuel tank is deactivated, while the high pressure pump is enabled, the pressure downstream of the first pressure relief valve may be lower than the pressure upstream of the valve. Consequently, at least a portion of the first fuel lifted from the first fuel tank by the first low pressure pump may flow from the first fuel passage into the second fuel passage via the first bypass passage. The first fuel that enters the second fuel passage may then flow through the high pressure pump before returning to the first fuel passage along the second bypass passage, via the solenoid valve. From there, the first fuel may be delivered to the engine via the first injector group. Since the second injector group is deactivated, none of the first fuel may be delivered to the engine via the second injector group. At the same time, the second pressure relief valve in the second fuel passage ensures that the first fuel does not flow into the second fuel tank.

The amount of first fuel that is delivered to the first injector group via the high pressure pump may be adjusted by adjusting and coordinating the output of the first low pressure fuel pump and the high pressure fuel pump. For example, operation of the lower pressure fuel pump and the higher pressure fuel pump may be adjusted to provide a prescribed fuel pressure at the fuel injectors or fuel rail. A fuel rail pressure sensor coupled to the first common fuel rail may be configured to provide an estimate of the fuel pressure available at the first group of port injectors. Then, based on a difference between the estimated rail pressure and a desired rail pressure, the pump outputs may be adjusted. In one example, the high pressure fuel pump may be a volumetric displacement fuel pump using a flow control valve to vary the effective pump volume of each pump stroke. However, it should be appreciated that other suitable higher pressure fuel pumps may also be used. The higher pressure fuel pump may be mechanically driven by the engine in contrast to the motor driven lower pressure fuel pump. A pump piston of the higher pressure fuel pump may receive a mechanical input from the engine crank shaft or cam shaft via a cam so that the pump is operated according to the principle of a cam-driven single-cylinder pump. In this way, by supplying fuel from a low pressure fuel pump and a high pressure fuel pump to a group of port injectors, degradation of the high pressure pump may be reduced.

Returning to 604, if no port injection is requested, that is, no delivery of the first fuel type to the engine via the first injector group is requested, then at 607, it may be confirmed whether direct injection of the first fuel type is requested (for example, in response to a fuel level in the second fuel tank falling below a threshold, as elaborated in FIG. 4). If yes, then at 608, the solenoid valve may be closed while the first port injector group and the first low pressure fuel pump are deactivated while the second direct injector group is enabled. An output of the first low pressure fuel pump and the high pressure fuel pump may be adjusted and coordinated. For example, the lower pressure fuel pump and the higher pressure fuel pump may be operated to maintain a prescribed fuel pressure at the fuel injectors or fuel rail. A fuel rail pressure sensor coupled to the second common fuel rail may be configured to provide an estimate of the fuel pressure available at the second group of direct injectors. Then, based on a difference between the estimated rail pressure and a desired rail pressure, the pump outputs may be adjusted.

At 610, it may be determined whether further enrichment is requested. In one example, further enrichment may be requested based on a change in engine operating conditions, such as, a change in engine speed-load conditions. If enrichment is requested, then at 612, the first injector group may be enabled so that at least a portion of the first fuel type lifted from the first fuel tank by the first low pressure pump can be delivered to the first port injector group along the first fuel passage and at least a portion of the lifted fuel can be delivered to the second direct injector group along the second fuel passage, via the high pressure pump. An output of the first low pressure pump and the high pressure pump may be adjusted so that a desired fuel pressure may be maintained at the first and second group of injectors. Feedback from pressure sensors coupled to each of the common fuel rails may be used by an engine controller to adjust and coordinate the output of the pumps.

In this way, during a first condition, a first type of fuel may be delivered solely from a first fuel tank to a first port injector and a high pressure pump via a first low pressure pump, the high pressure pump communicating with a direct injector and a port injector. By deactivating the direct injector while fuel is supplied to the port injector via the high pressure pump, fuel may be port injected upon circulation through the high pressure pump when no direct injection is requested, thereby maintaining high pressure pump cooling and lubrication. In comparison, during a second condition when cooling and/or lubrication is not requested, the first type of fuel may be delivered solely from the first fuel tank to the first port injector via the first low pressure pump while bypassing the high pressure fuel pump. Further, during a third condition, such as in response to a drop on fuel level in the second fuel tank, the first fuel type may delivered solely from the first fuel tank to a second direct injector via the first low pressure fuel pump and the high pressure fuel pump.

By circulating a port injected fuel through a high pressure fuel pump when no direct injection is requested, and/or when no fuel is available for direct injection, the high pressure pump temperature and lubrication may be maintained, thereby reducing pump degradation. Further, by reducing the occurrence of high pressure pump shutdown, the component life of the high pressure pump may also be extended.

As will be appreciated by one of ordinary skill in the art, routines described in FIGS. 4-6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A fuel system for an internal combustion engine, comprising:
   a first fuel tank storing a first fuel type;
   a second fuel tank storing a second fuel type;
   a group of port fuel injectors in communication with a group cylinders;
   a group of direct injectors in communication with the group of cylinders;
   a first low pressure fuel pump in communication with the first fuel tank;
   a high pressure fuel pump in communication with the group of port fuel injectors via a solenoid valve, and further communicating with the group of direct injectors; and
   a control system configured with instructions for:
      supplying the first fuel type solely from the first fuel tank to the group of port fuel injectors via the first low pressure fuel pump and the high pressure fuel pump; and
      supplying the first fuel type solely from the first fuel tank to the group of direct injectors via the first low pressure fuel pump and high pressure fuel pump.

2. The fuel system of claim 1, where the supplying the first fuel type to the group of port fuel injectors via the first low pressure fuel pump and the high pressure fuel pump is in response to a request for cooling or lubrication of the high pressure fuel pump.

3. The fuel system of claim 1, where the supplying to the group of direct injectors via the first low pressure fuel pump and the high pressure fuel pump is in response to a fuel level in the second fuel tank falling below a threshold.

4. The fuel system of claim 1, where the first fuel type includes at least some gasoline and the second fuel type includes at least some ethanol.

5. The fuel system of claim 1, where a first fuel passage fluidly couples the first fuel tank to the group of port fuel injectors, and where a second fuel passage fluidly couples the second fuel tank to the group of direct injectors, and where the high pressure fuel pump communicates with the group of port fuel injectors via a solenoid valve, and where a second low pressure fuel pump is in communication with the second fuel tank and the high pressure fuel pump.

6. A method of operating an engine fuel system, comprising:
   supplying a first type of fuel solely from a first fuel tank to a second fuel pump and to a group of port fuel injectors via a first fuel pump, an output of the second fuel pump in communication with a group of direct injectors; and
   supplying the first type of fuel from the second fuel pump outlet to the group of port fuel injectors.

7. The method of claim 6, where the first fuel pump is an electrically powered low pressure fuel pump and where the second fuel pump is a mechanically powered high pressure pump.

8. The method of claim 7, where the second fuel pump supplies the first fuel type to the group of port fuel injectors via a valve coupling the group of direct injectors to the group of port fuel injectors.

9. The method of claim 6, further comprising deactivating the group of direct injectors and a third fuel pump.

10. The method of claim 6, where the first type of fuel is supplied to the second fuel pump in response to a level of a second type of fuel in a second fuel tank falling below a threshold level.

11. The method of claim 6, where the first type of fuel is supplied to the second fuel pump in response to a temperature of the second fuel pump exceeding a threshold temperature.

12. The method of claim 6, where the first type of fuel is supplied in response to at least an engine operating condition, including an engine load.

13. The method of claim 6, where an output of the first fuel pump is adjusted to provide a fuel pressure to a first rail of the group of port injectors, the first fuel type being supplied to the group of port injectors from both the outlet of the second fuel pump and the outlet of the first fuel pump in parallel and concurrently, at least some of the fuel from the outlet of the first fuel pump provided to the group of fuel injectors by bypassing the second fuel pump.

14. A method of operating an engine fuel system, comprising:
- during a first condition, delivering a first type of fuel solely from a first fuel tank to a first port injector and a second fuel pump via a first fuel pump, the second fuel pump outlet communicating with a first direct injector and the first port injector;
- during a second condition, delivering the first fuel type solely from the first fuel tank to the first port injector via the first fuel pump while bypassing the second fuel pump; and
- during a third condition, delivering the first fuel type solely from the first fuel tank to the first direct injector via the first fuel pump and the second fuel pump.

15. The method of claim 14, where the first fuel pump is a lower pressure fuel pump while the second fuel pump is a higher pressure fuel pump.

16. The method of claim 15, where the first fuel pump is electrically-driven and the second fuel pump is mechanically driven.

17. The method of claim 16, where the third condition includes a fuel level in a second fuel tank falling below a threshold.

18. The method of claim 16, where the fuel system includes a solenoid valve located downstream of the first fuel pump and upstream of the second fuel pump in a direction of fuel flow, and wherein during first condition, the solenoid valve is opened, and wherein during the second and third conditions, the solenoid valve is closed.

19. The method of claim 15, where during the first and second conditions, the first direct injector and a third fuel pump are deactivated, where the third fuel pump is coupled to a second fuel tank.

20. The method of claim 15, where the first condition includes one or more of a temperature of the second fuel pump exceeding a threshold temperature.

* * * * *